Patented Nov. 28, 1950

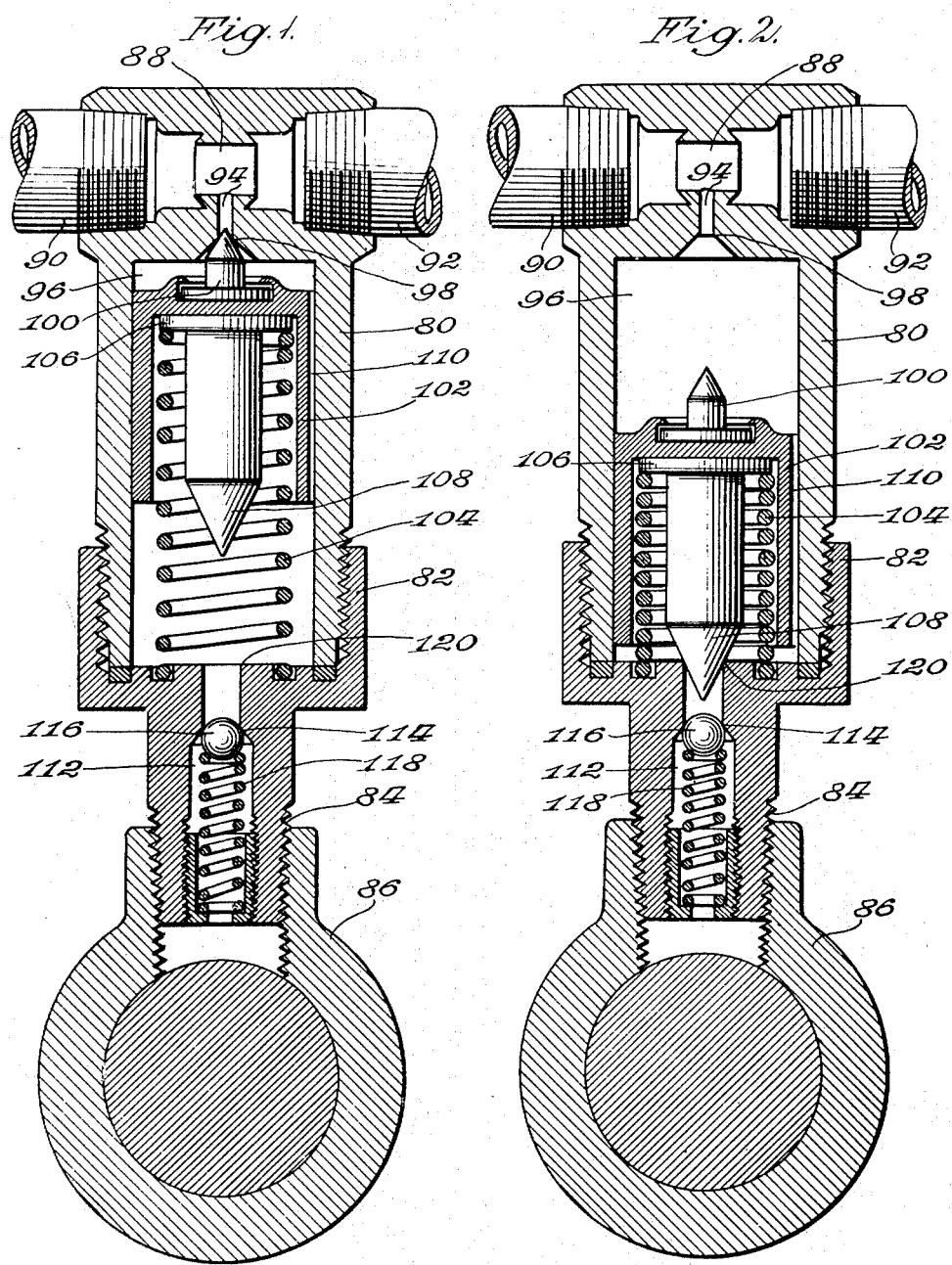

2,532,269

UNITED STATES PATENT OFFICE 2,532,269

MEASURING VALVE

Ernest W. Davis, River Forest, Ill., assignor to Stewart-Warner Corporation, Chicago, Ill., a corporation of Virginia Original application August 26, 1942, Serial No. 456,281. Divided and this application October 4, 1945, Serial No. 620,339

1 Claim. (Cl. 184—7)

My invention relates to measuring valves and more particularly to measuring valves for centralized lubricating systems.

In centralized lubricating systems, lubricant from a central source such as a lubricant compressor is forced through a piping system having branches arranged in parallel and connected to the various bearings to be supplied with lubricant from the central source. The different bearings may have the same or different lubrication requirements and it is common to provide the branches of the lubricating system with measuring valves or other metering means for insuring the supply of just the proper amount of lubricant to each bearing.

My invention relates to measuring valves intended to be used in such a lubricating system and an object of my invention is to provide a new and improved measuring valve which will accurately meter a predetermined quantity of lubricant under all operating conditions of the lubricating system.

Another object of my invention is to provide a measuring valve which is economical to manufacture and which will provide long service without attention or repair.

Another object of my invention is to provide a new and improved measuring valve which can be readily installed by a person without special training or instruction.

Other objects and advantages of my invention will become apparent as the description proceeds.

In the drawings:

Fig. 1 is a longitudinal sectional view through a measuring valve embodying one form of my invention and illustrating this measuring valve as being connected to a bearing and to the piping of a centralized lubricating system; and Fig. 2 is a view similar to Fig. 1 but showing the parts of the measuring valve in different positions.

This application is a division of my co-pending, now abandoned, application Serial No. 456,281, filed August 26, 1942.

In the drawings I have illustrated an embodiment of my invention wherein the measuring valve has a body 80 closed at one end by a cap 82 having a threaded nipple 84 adapted to be attached to the bearing 86. The other end of the body 80 is shown as having a cross passage 88 which cooperates with pipes 90 and 92 to form a part of the pipe line of the centralized lubricating system.

A small bore 94 forms an inlet leading to the cylindrical chamber 96 in the valve body 80. The bore 94 is provided with a valve seat 98 normally closed by the conical end of a valve 100 which is floatingly mounted in the upper end of the piston 102.

A spring 104 urges the piston 102 toward the inlet end of cylinder 96 and holds valve 100 against its seat 98. The spring 104 also holds the flanged base 106 of a valve 108 against the under side of the piston head. The piston 102 is provided with a bypass passage 110 of such size and length as to offer high resistance to flow of lubricant therethrough.

The cylinder 96 is connected to the bearing surfaces by way of a passage 112 having a valve seat 114. A ball check valve 116 is urged against the seat 114 by a spring 118. In this embodiment of my invention, the spring 118 is relatively light and only a low pressure is required to open the check valve 116. The spring 104, however, is sufficiently strong so that a high lubricant pressure is required to open the valve 100.

When lubricant under high pressure, for example, 1000 pounds per square inch, is supplied to the line by the lubricant compressor, valve 100 is moved downwardly away from its seat 98 and thereupon the entire head of the piston 102 is exposed to the lubricant pressure in the line. The space below the piston 102 is filled with lubricant from the previous operation of the valve, but the check valve 116 offers little resistance to passage of this lubricant to the bearing 86. The high lubricant pressure acting over the entire upper end of the piston 102 moves the piston 102 downwardly with little differential pressure between the ends of this piston, and the lubricant therebelow is forced into the bearing 86.

Downward movement of the piston 102 is arrested when the tapered lower end of valve 108 engages the inlet end 120 of passage 112 leading to the bearing 86. The valve 108 will be held in this position shown in Fig. 2 because the area acted upon by lubricant pressure tending to seat valve 108 is sufficiently great to overbalance the spring pressure and the lubricant pressure acting upon the area which would tend to unseat the valve. The difference in these areas results from the size of the inlet end 120 of passage 112. This position of the parts is shown in Fig. 2 and the parts remain in this position until all of the measuring valves in the lubricating system have operated to supply lubricant to their bearings. Thereafter, the lubricant pressure in the line is released and the piston of each measuring valve is returned to the position shown in Fig. 1 under the force exerted by its spring 104, As each piston moves upwardly from the position of Fig. 2 to that of Fig. 1, the grease or other lubricant flows through bypass 110. When the piston reaches a position of Fig. 1, the space beneath the piston is filled with lubricant and the measuring valve is conditioned for a subsequent operation.

Owing to the great difference in area between the exposed part of the valve 100 and the head of the piston 102, these measuring valves have a high differential action which permits them to operate one at a time when connected in multiple. This is made possible by the fact that the opening of valve 100 of one measuring valve reduces the pressure in the pipe line immediately so that no other measuring valve will operate until the first valve has discharged its measured quantity of lubricant to its bearing.

It is to be understood that my invention is not limited to the particular detail shown and disclosed, but may assume numerous other forms not specifically illustrated or described herein. The scope of my invention is defined by the following claim.

I claim:

A measuring valve of the class described, comprising a body having an inlet provided with a valve seat of small diameter and a cylinder communicating with said inlet, a piston reciprocable in said cylinder, said piston comprising a head and a downwardly extending skirt adjacent the walls of said cylinder throughout substantially one-half the length thereof, a valve floatingly mounted in said head and having a tapered portion adapted to cooperate with said valve seat, said body having an outlet passage provided with a pair of valve seats, said pair of valve seats being of the same diameter and larger than said first named valve seat, a second valve movable with said piston and adapted to cooperate with one of said last named valve seats, said last named valve having an enlarged upper end engaging said piston and a tapered lower end for engaging its valve seat, a spring confined between said body and enlarged upper end of said last named valve for holding said valve in contact with said piston, said spring also urging said piston toward said first named valve seat and adapted to hold said first named valve in contact with its seat, said piston skirt having a longitudinal recess providing a bypass passage for said piston, and a relatively light check valve for the other of said pair of valve seats.

ERNEST W. DAVIS.

REFERENCES CITED

The following references are of record in the file of this patent:

UNITED STATES PATENTS

| Number | Name | Date |
|---|---|---|
| 1,652,765 | Cowles | Dec. 13, 1927 |
| 1,707,993 | Piquerez | Apr. 9, 1929 |
| 1,803,601 | Davis | May 5, 1931 |
| 2,308,865 | Davis | Jan. 19, 1943 |

FOREIGN PATENTS

| Number | Country | Date |
|---|---|---|
| 679,358 | France | Jan. 9, 1930 |